June 5, 1951  J. D. FRICK  2,555,439
PICTURE CARRIER FOR OPAQUE PROJECTORS
Filed Jan. 14, 1949  2 Sheets-Sheet 1
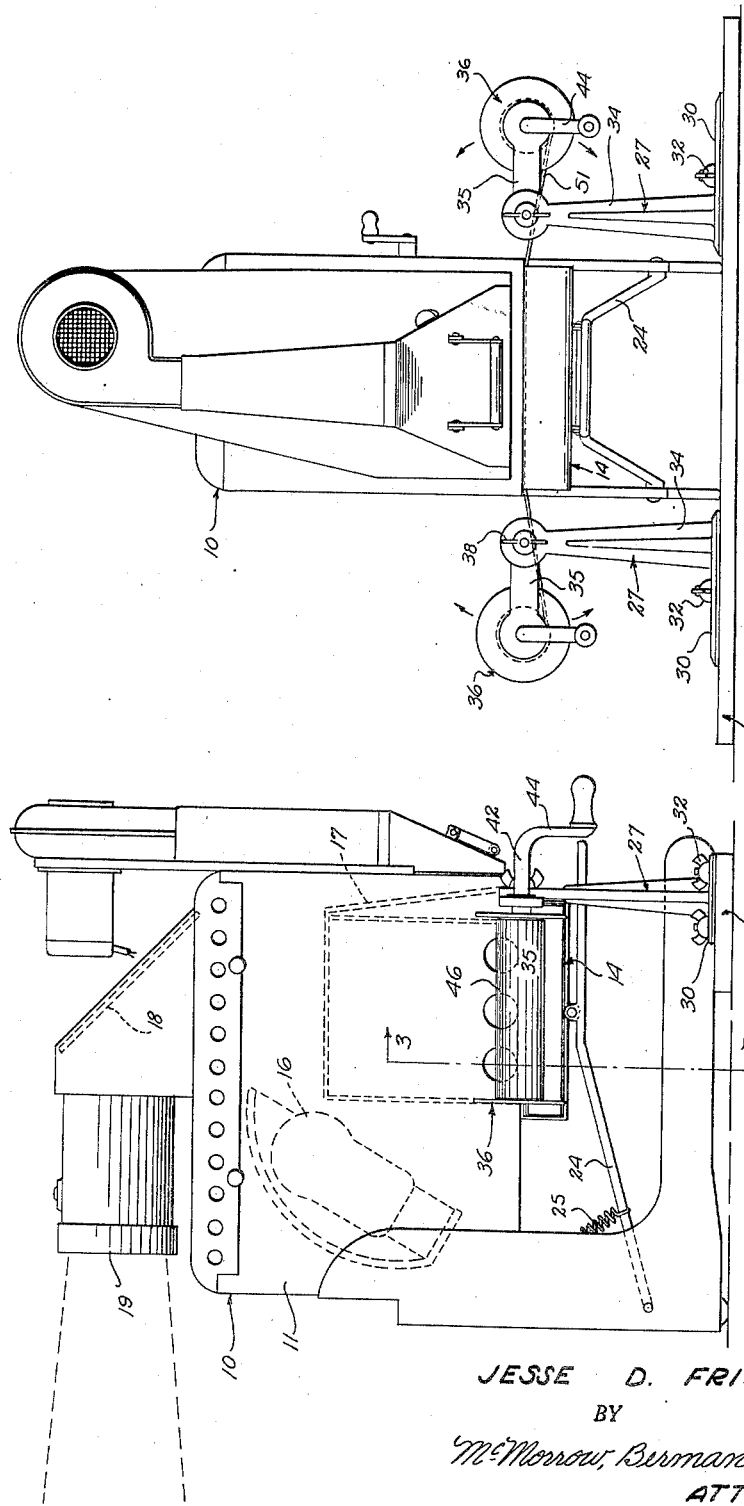
INVENTOR.
JESSE D. FRICK,
BY
McMorrow, Berman & Davidson
ATTORNEYS.

June 5, 1951 J. D. FRICK 2,555,439
PICTURE CARRIER FOR OPAQUE PROJECTORS
Filed Jan. 14, 1949 2 Sheets-Sheet 2
FIG. 3.
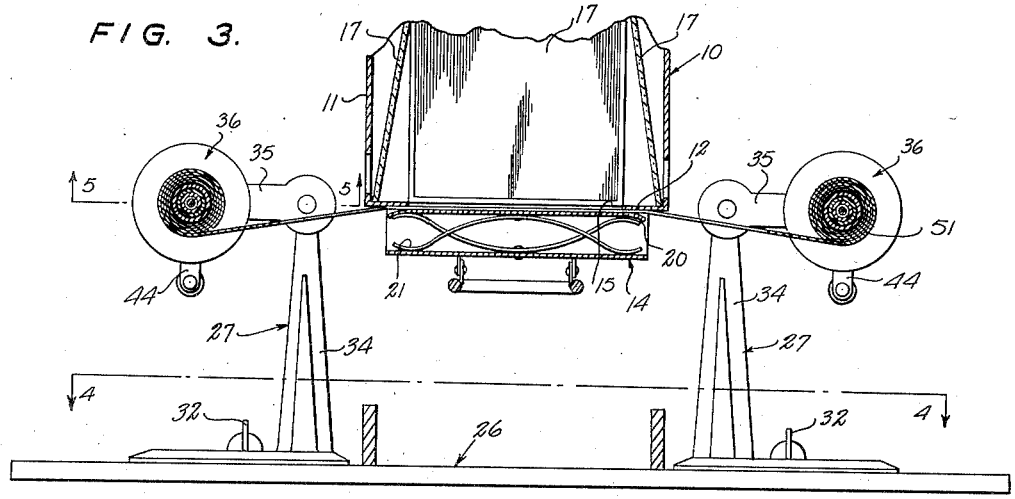
FIG. 4.
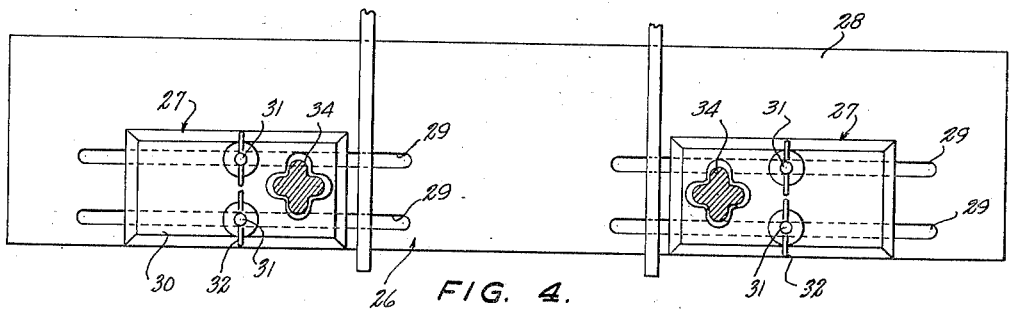
FIG. 5.
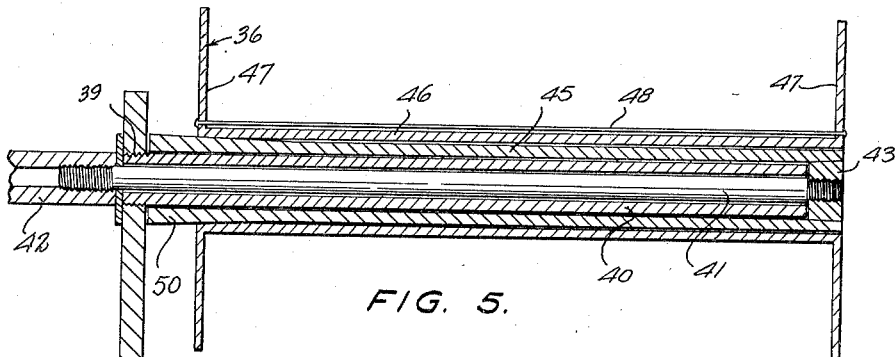
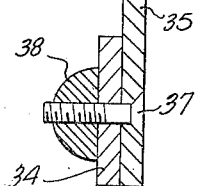
INVENTOR.
JESSE D. FRICK,
BY
McMorrow, Berman + Davidson
ATTORNEYS.

Patented June 5, 1951

2,555,439

UNITED STATES PATENT OFFICE 2,555,439

PICTURE CARRIER FOR OPAQUE PROJECTORS

Jesse D. Frick, Pelion, S. C.

Application January 14, 1949, Serial No. 70,927

5 Claims. (Cl. 88—24)

This invention relates to opaque projectors, and more particularly to winding spool mounting means for feeding pictures to the projector.

It is an object of this invention to provide a pair of winding spools associated with an opaque projector for feeding pictures or legends to the projector in such a manner that a continuous series of pictures may be projected onto a screen or the like. The pictures will be continuously fed to the projector so that the projector may be advantageously used in lectures, as in schools or other forms of training. The feeding of the pictures will be continuous and under the selective control of the operator whereby the operator may expose selected pictures for selected lengths of time.

Another object of this invention is to provide a pair of winding drums for feeding pictures to and from an opaque projector, the winding drums being adjustably mounted on a common base, free of the projector, whereby the winding drums may be used on various projectors when and as desired.

With the above and other objects in view, my invention consists in the arrangement, combination and details of construction disclosed in the drawings and specification, and then more particularly pointed out in the appended claims.

In the drawings:

Figure 1 is a side elevation of an opaque projector having a picture carrier constructed according to an embodiment of my invention.

Figure 2 is a rear end elevation.

Figure 3 is a transverse section, partly broken away, taken on the line 3—3 of Figure 1.

Figure 4 is a horizontal transverse section taken on the line 4—4 of Figure 3.

Figure 5 is a fragmentary, detailed section taken on the line 5—5 of Figure 3.

Referring to the drawings the numeral 10 designates generally an opaque projector having a housing 11 for projecting images from an opaque picture or the like. The projector 10 is of conventional formation wherein the housing 11 is formed with an open bottom wall 12 and a picture or legend supporting member 14 for supporting an opaque picture in the opening 15 of the bottom wall 12. An electric lamp 16 is mounted within the housing 11 and is associated with mirrors 17 for illuminating the picture on the carrier 14. A mirror 18 is mounted above the housing 11, and is operatively associated with a lens 19 for projecting the image of the picture onto a screen or the like.

The picture supporting plate or carrier 14 is open on the opposite sides thereof and a pressure plate 20 is supported on the carrier 14 for pressing the pictures against the lower surface of the bottom wall 12 of the housing 11. Springs, as 21, are fixed between the lower portion of the carrier 14 and the under surface of the pressure plates 20 for pressing the pressure plate and the pictures above the plate into engagement with the bottom wall 12 about the opening 15.

In the use of the opaque projector 10, described above, heretofore it has been the practice to place a picture to be exposed on the pressure plate 20 for the length of time desired. For changing the picture, the first picture will be removed by swinging the carrier 14 downwardly on its supporting arms 24, which are pivoted on the forward end of the supporting frame of the projector. The supporting arms are spring pressed upwardly by the springs 25 for constantly pressing the carrier 14 upwardly into engagement with the lower surface of the housing 11. Considerable time has been expended during the course of a lecture in the changing of the pictures or legends to be projected. It is an object of this invention to provide means for supporting winding spools of pictures, film or other devices which are to be exposed, on opposite sides of the film carrier 14 so that the various pictures may be moved from one side to the other with the carrier 14 in its fully raised position.

In the use of winding drums for moving the pictures across the opening 15 of the projector 10, considerable time will be saved for the operator and a more continuous sequence will be maintained when the projector 10 is used for teaching lectures, as in schools or the like.

The picture carrier of my invention comprises an elongated base or plate 26 which is adapted to be disposed below the rear end of the projector 10. The base plate 26 extends outwardly from the opposite sides of the projector 10 and a pair of supporting members 27 are adjustably mounted on the opposite ends of the plate 26. The plate 26 includes a flat plate 28 having a pair of longitudinally extending slots 29 on the opposite ends thereof with which the supporting members 27 are adapted to be engaged.

The supporting members 27 are each formed with a flat plate 30 which is adapted to overlie an end of the base plate 28. Bolts or screws 31 engage through the plates 30 and through the slots 29. Wing nuts 32 or other suitable fastening means are carried by the bolts 31 for securing the base plates 30 in a selected position along the length of the slots 29.

A vertically extending post 34 is fixed to or formed integral with the plate 30 on one end thereof. While the supporting members 27 are disposed on opposite sides of the projector 10, the vertically extending posts 34 are disposed closely adjacent the vertical side walls of the housing 11, and preferably the upper end of the supporting posts 24 will extend upwardly at least as far as the horizontal plane of the bottom wall 12 of the housing 11.

An arm 35 is pivotally mounted on the upper end of the supporting posts 24 for vertically adjusting the picture carrying spools 36. A pivot pin 37 extends through the upper end of the supporting post 34, and through the lower end of the arm 35 for pivotally connecting the arm 35 onto the post 34. The pivot pin 37 is rotatably engaged in the arm 35 and in the post 34, and a nut as 38, threadably engaging the pin 37 will provide for frictionally engaging the arm 35 with the post 34 for supporting the arm 35 in a selected adjusted angle.

The free end of the arm 35 is formed with a threaded opening 39 therethrough and one end of an elongated tubular axle 40 is threadably engaged in the opening 39 for supporting the winding drum 36 on the arm 35. An elongated shaft 41 extends through the axle 40 and through the arm 35. The shaft 41 is threaded on the opposite ends thereof where the ends extend beyond the end of the axle 40 and the arm 35. The shank 42 of a crank 44 is threadably engaged on one end of the shaft 40 opposite from the extension of the axle 40 relative to the arm 35. A tubular member 45 is rotatably mounted on the axle 40. A nut 46 is fixed in the end of the cylindrical member 45 outwardly from the arm 35. The nut 46 is threadably engaged on the other end of the shaft 41 whereby the outer cylindrical member 45 will be rotated with the shaft 41, when the shaft 41 is rotated by the crank 44.

The picture winding drum is frictionally engaged about the tubular member 45 for rotation therewith. The winding drum or reel 36 is formed with an elongated tubular hub 46 engageable about the tubular member 45 and a pair of radially extending end walls 47 fixed to or formed on the opposite ends of the member 46. A pin, 48, is fixed between the end plates 47 spaced slightly above the hub 46 for securing an end of the roll of pictures to be mounted thereon. One end of the flexible roll of pictures is adapted to be engaged between the pin 48 and the outer surface of the hub 46 for frictionally supporting the end of the film or pictures thereon while the roll is being wound about the hub.

The inner end of the tubular member 45, adjacent the arm 35, is tapered toward the arm 35 where it is slightly enlarged to provide for the frictional engagement of the sleeve 46 of the hub of the winding drum 36 onto the tubular member 45. The hub 46 may be slid substantially along the length of the member 45 to be positioned thereon and will be frictionally engaged with the member 45 when one circular end plate 47 is adjacent the arm 35. While the hub 46 will substantially engage the tubular member 45 throughout the entire length, the friction between the tapered ends 50 and the hub 46 will hold the hub and the winding drum against sliding off from the free end of the member 45.

In the use and operation of the picture carrier for the opaque projector, a roll of pictures 51 is initially engaged about the hub 46 of one of the winding drums 36. The arms 35 of the supporting members 27 are positioned so that the axes of the shafts 41 are substantially in alignment with a horizontal plane across the bottom wall 12 of the housing 11, the plane on which the picture will be exposed within the housing. A length of the picture roll 51 is initially extended across the lowered carrier 14 for engagement with the winding drum 36 of the opposite member 27. The picture carrier 14 is then raised to its operative position for pressing the portion of the roll 51 below the housing 11 up into engagement with the lower surface of the bottom wall 12, where the pictures on the roll 51 will be exposed in the opening 15. A plurality of pictures or legends will be carried by the picture roll 51 so that the pictures and legends may be changed in the opening 15 by rotation of the winding drums 36, while the carrier 14 is in its fully raised position.

I do not mean to confine myself to the exact details of construction herein disclosed, but claim all variations falling within the purview of the appended claims.

I claim:

1. A picture carrier for an opaque projector comprising an elongated base, a pair of upstanding supporting members mounted on the opposite ends of said base for sliding along the length thereof and for disposition on opposite sides of said projector, a vertically swinging arm on the upper end of each of said supporting members mounted for swinging transversely of said projector, a horizontal tubular axle fixed on each of said arms, a shaft extending through said axle, a sleeve rotatable on said axle and fixed at one end to one end of said shaft, means for rotating said shaft fixed on the other end of said shaft, and a picture winding drum frictionally engaging about said rotatable sleeve.

2. A picture carrier for an opaque projector comprising a base adapted to be supported transversely of the projector, a first upstanding support positioned on said base and having its lower end mounted on the latter for sliding movement longitudinally thereof, a second upstanding support positioned on said base in spaced confronting relation with respect to said first named upstanding support and having its lower end mounted on said base for movement longitudinally thereof, means operatively connected to each of said upstanding supports and engageable with said base for selectively positioning each of said upstanding supports in their respective paths of movement, an arm disposed contiguous to each of the upper ends of said first and second upstanding supports and mounted thereon for swinging movement about a horizontal axis, and reel means disposed transversely of each of said arms and mounted thereon for rotary movement about select horizontal axes in the path of rocking movement of the supporting one of said arms.

3. A picture carrier for an opaque projector comprising a base adapted to be supported transversely of the projector, a first upstanding support positioned on said base and having its lower end mounted on the latter for sliding movement longitudinally thereof, a second upstanding support positioned on said base in spaced confronting relation with respect to said first named upstanding support and having its lower end mounted on said base for movement longitudinally thereof, means operatively connected to each of said upstanding supports and engageable with said base for selectively positioning each of said upstanding supports in their respective paths of movement, an arm disposed contiguous to each of the upper ends of said first and second upstanding supports and mounted thereon for swinging movement about a horizontal axis, reel means disposed transversely of each of said arms and mounted thereon for rotary movement about select horizontal axes in the path of rocking movement of the supporting one of said arms, and means operatively connected to each of said arms and the adjacent one of said upstanding supports for fixedly positioning each of said arms in a select position of its rocking movement.

4. A picture carrier for an opaque projector comprising a base adapted to be supported transversely of the projector, a first upstanding support positioned on said base and having its lower end mounted on the latter for sliding movement longitudinally thereof, a second upstanding support positioned on said base in spaced confronting relation with respect to said first named upstanding support and having its lower end mounted on said base for movement longitudinally thereof, means operatively connected to each of said upstanding supports and engageable with said base for selectively positioning each of said upstanding supports in their respective paths of movement, an arm disposed contiguous to each of the upper ends of said first and second upstanding supports and mounted thereon for swinging movement about a horizontal axis, and reel means disposed transversely of each of said arms and mounted thereon for rotary movement about select horizontal axes in the path of rocking movement of the supporting one of said arms, each of said reel means comprising a horizontally disposed tubular axle having one end fixedly secured to the adjacent one of said arms, a shaft disposed within said axle and having one of its ends extending through and projecting beyond said adjacent one of said arms, a sleeve circumposed about said axle and having its end remote from said adjacent one of said arms fixedly secured to the other end of said shaft, hand actuable means fixedly secured to said projecting end of said shaft, and a drum disposed about said sleeve and in frictional engagement with the latter.

5. A picture carrier for an opaque projector comprising a base adapted to be supported transversely of the projector, a pair of upstanding supports positioned on said base in spaced confronting relation with respect to each other and secured to said base, an arm disposed contiguous to each of the upper ends of said pair of upstanding supports and mounted thereon for swinging movement about a horizontal axis, reel means disposed transversely of each of said arms and mounted thereon for rotary movement about select horizontal axes in the path of rocking movement of the supporting one of said arms, and means operatively connected to each of said arms and the adjacent one of said upstanding supports for fixedly positioning each of said arms in a select position of its rocking movement.

JESSE D. FRICK.

REFERENCES CITED

The following references are of record in the file of this patent:

UNITED STATES PATENTS

| Number | Name | Date |
|---|---|---|
| 1,429,244 | Isbills | Sept. 19, 1922 |
| 1,726,120 | Perry | Aug. 27, 1929 |
| 2,016,188 | Watkins | Oct. 1, 1935 |
| 2,291,541 | Fernandez | July 28, 1942 |
| 2,395,561 | Osterberg | Feb. 26, 1946 |